United States Patent
Wei et al.

(10) Patent No.: US 11,022,949 B2
(45) Date of Patent: Jun. 1, 2021

(54) PLC VIRTUAL PATCHING AND AUTOMATED DISTRIBUTION OF SECURITY CONTEXT

(71) Applicant: Siemens Aktiengesellschaft, München (DE)

(72) Inventors: Dong Wei, Edison, NJ (US); Leandro Pfleger de Aguiar, Robbinsville, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 197 days.

(21) Appl. No.: 16/305,955

(22) PCT Filed: Jun. 24, 2016

(86) PCT No.: PCT/US2016/039237
§ 371 (c)(1),
(2) Date: Nov. 30, 2018

(87) PCT Pub. No.: WO2017/222553
PCT Pub. Date: Dec. 28, 2017

(65) Prior Publication Data
US 2019/0317465 A1    Oct. 17, 2019

(51) Int. Cl.
*G05B 19/05*     (2006.01)
*G06F 9/455*     (2018.01)
(Continued)

(52) U.S. Cl.
CPC ....... *G05B 19/058* (2013.01); *G06F 9/45558* (2013.01); *G06F 21/53* (2013.01);
(Continued)

(58) Field of Classification Search
None
See application file for complete search history.

(56) References Cited

U.S. PATENT DOCUMENTS 10,050,999 B1 *   8/2018   Rossman .......... H04L 63/1433
2005/0240781 A1  10/2005   Gassoway
(Continued)

FOREIGN PATENT DOCUMENTS

CN   102467637 A1   5/2012
EP   2154626 A2    2/2010
(Continued)

OTHER PUBLICATIONS

PCT International Search Report and Written Opinion of International Searching Authority dated Mar. 2, 2017 corresponding to PCT International Application No. PCT/US2016/039237 filed Jun. 24, 2016.

*Primary Examiner* — Jason Lin (57) ABSTRACT

A system for virtual patching of security vulnerabilities in an industrial production environment includes an industrial automation device (e.g., a PLC). The industrial automation device comprises an instance of a distributed database spanning a plurality of industrial automation devices and storing one or more virtual patches and an app container comprising a virtual patching engine security application. The app container is configured to collect system information generated by the industrial automation device during operation, and apply the one or more virtual patches to the system information to identify one or more security attacks.

12 Claims, 3 Drawing Sheets

(51) Int. Cl.
*G06F 21/53* (2013.01)
*G06F 21/55* (2013.01)
*G06F 21/57* (2013.01)

(52) U.S. Cl.
CPC .......... *G06F 21/554* (2013.01); *G06F 21/577* (2013.01); *G06F 2009/45587* (2013.01); *G06F 2009/45595* (2013.01)

(56) References Cited

U.S. PATENT DOCUMENTS

| | | | | |
|---|---|---|---|---|
| 2009/0094673 A1* | 4/2009 | Seguin | .................... | G06F 21/54 |
| | | | | 726/1 |
| 2009/0113550 A1* | 4/2009 | Costa | .................... | G06F 21/52 |
| | | | | 726/25 |
| 2009/0158432 A1 | 6/2009 | Zheng et al. | | |
| 2009/0271504 A1* | 10/2009 | Ginter | ................ | H04L 41/0806 |
| | | | | 709/220 |
| 2010/0043073 A1* | 2/2010 | Kuwamura | ............. | G06F 21/56 |
| | | | | 726/24 |
| 2011/0276695 A1* | 11/2011 | Maldaner | ................ | H04L 41/00 |
| | | | | 709/226 |
| 2013/0047147 A1* | 2/2013 | McNeill | .................... | G06F 8/65 |
| | | | | 717/173 |
| 2013/0086688 A1 | 4/2013 | Patel et al. | | |
| 2014/0137257 A1* | 5/2014 | Martinez | ............. | H04L 63/1433 |
| | | | | 726/25 |
| 2014/0223556 A1* | 8/2014 | Bignon | ............... | H04L 63/1441 |
| | | | | 726/22 |
| 2014/0304685 A1* | 10/2014 | Xie | .................... | G06F 9/45558 |
| | | | | 717/124 |
| 2014/0380314 A1* | 12/2014 | Shimada | ................ | G06F 9/4856 |
| | | | | 718/1 |
| 2015/0295944 A1 | 10/2015 | Yunoki et al. | | |
| 2015/0381651 A1* | 12/2015 | Lietz | ....................... | G06F 21/55 |
| | | | | 726/23 |
| 2017/0139393 A1* | 5/2017 | Boss | .................... | G05B 19/058 |

FOREIGN PATENT DOCUMENTS

| | | |
|---|---|---|
| JP | 2006-178936 A1 | 7/2006 |
| JP | 2010-044613 A1 | 2/2010 |
| JP | 2010-055318 A1 | 3/2010 |
| JP | 2015-222576 A1 | 12/2015 |
| JP | 2016-505981 A1 | 2/2016 |
| WO | 2015/001594 A1 | 1/2015 |
| WO | 2016/093182 A1 | 6/2016 |

* cited by examiner

PLC VIRTUAL PATCHING AND AUTOMATED DISTRIBUTION OF SECURITY CONTEXT

TECHNICAL FIELD

The present invention relates generally to improving the resiliency of control systems, with respect to cyberattacks, with virtual patching and automated distribution of security context information. The disclosed technology may be applied to, for example, various automated production environments where industrial controllers such as programmable logic controllers (PLCs) and distributed control systems (DCS) are used.

BACKGROUND

Security patching is one of the most challenging problems faced by the Industrial Control Systems (ICS) security community. In order to fix security vulnerability in a given programmable logic controller (PLC), a complete firmware update and a full system reboot is required in most cases. In addition, security patches might introduce new failures and vulnerabilities, which dramatically increases the risk and cost of updating live running production systems.

Traditionally, patch management for industrial control systems has been performed manually in most cases. Additional (external) security controls, as recommended by applicable standards and best practices, deploy measures to offer additional protection to compensate for long patch delays (see International Electrotechnical Commission 62443.02.01_2009) while waiting for patch compatibility testing results from the application vendor. Such measures, however, reside typically outside the PLC and are limited by what can be done at the network level.

SUMMARY

Embodiments of the present invention address and overcome one or more of the above shortcomings and drawbacks, by providing methods, systems, and apparatuses related to virtual patching and automated distribution of security context information for control systems. More specifically, the techniques described herein provide an automated mechanism (a process), architecture and a security application (e.g., an app) for a PLC that allows the deployment of virtual patches without the need to reload the complete software image/OS. The virtual patch provides protection against potential attackers exploiting the unmitigated vulnerability from the time slot between the vulnerability disclosure and the system upgrade.

According to some embodiments of the present invention, a system for virtual patching of security vulnerabilities in an industrial production environment includes an industrial automation device (e.g., a PLC). The industrial automation device comprises an instance of a distributed database spanning a plurality of industrial automation devices and storing one or more virtual patches and an app container comprising a virtual patching engine security application. The app container is configured to collect system information generated by the industrial automation device during operation, and apply the one or more virtual patches to the system information to identify one or more security attacks. Each virtual patch may describe a distinct attack signature exploitable on the industrial automation device.

The system information used in the aforementioned system may correspond to system calls made by one or more applications executing on the industrial automation device. In some embodiments, the system information comprises one or more of (i) memory blocks where at least one of a read or write operation has been performed; (ii) system configuration changes; and (iii) alarm status changes. Additionally (or Alternatively), the system information may include one or more of (i) processes executing on the industrial automation device; (ii) threads executing on the industrial automation device; (iii) networking connections utilized by the industrial automation device; (iv) file creation information; and (v) file modification information.

In some embodiments of the aforementioned system, the virtual patching engine security application performs symbolic execution of control code executed by the industrial automation device to determine future consequences of running one or more configurations of the industrial automation device in combination with one or more control commands. These future consequences may be identified in the form of indicators of, for example, security violations, system failure, or other undesired states. The virtual patching engine security application may block future execution of the control commands if the indicator of future consequences corresponds to, for example, an unsafe system state or a violation of predetermined safety constraints associated with the industrial production environment.

In some embodiments of the aforementioned system, the instance of the distributed database and the app container are executed in a first virtual machine on the industrial automation device. The industrial automation device may further include a second virtual machine which executes a process image updated according to a scan cycle with automation system production data associated with one or more field devices and a networking component configured to send and receive automation system network data on a plant floor network. In one embodiment, the second virtual machine also executes a real-time database comprising an embedded historian which is configured to store the automation system production data collected via the process image and the automation system network data collected via the networking component. The system information generated by the industrial automation device during operation may then be retrieved by the virtual patching engine security application from the embedded historian.

In some embodiments of the aforementioned system, the virtual patching engine security application is further configured to (i) receive new virtual patches generated by a security operations center and (ii) store the new virtual patches in the distributed database. Additionally, the virtual patching engine security application may be further configured to transmit an indication of the security attacks to the security operations center. In some embodiments, the virtual patching engine security application is further configured to identify one or more control commands associated with the one or more security attacks. In response to identifying one or more security attacks, the virtual patching engine security application determines whether an active response setting is enabled. If the active response setting is not enabled, the control commands are executed and an anomaly is reported to an operator associated with the industrial automation device. On the other hand, if the active response setting is enabled, execution of the control command(s) is blocked.

According to other embodiments of the present invention, a system for virtual patching of security vulnerabilities in an industrial production environment comprises two virtual machines, an internal communication channel configured to facilitate transfer of the system information between the virtual machines, and a hypervisor executing the virtual machines. The first virtual machine in the system executes one or more control programs, while the second virtual machine executes a virtual patching engine security application (e.g., in an app container as described above). This virtual patching engine security application is configured to collect system information related to the one or more control programs, and apply one or more virtual patches to the system information to identify one or more security attacks. This system information may include, for example, one or more of (i) memory blocks where at least one of a read or write operation has been performed; (ii) system configuration changes; and (iii) alarm status changes; (iv) processes executing on the first virtual machine; (v) threads executing the first virtual machine; (vi) networking connections utilized by the first virtual machine; (vii) file creation information; and/or (viii) file modification information. In some embodiments, the second virtual machine further comprises an instance of a distributed database spanning a plurality of industrial controllers and storing the one or more virtual patches. In some embodiments, the system information is retrieved by the virtual patching engine security application from an embedded historian in the first virtual machine.

According to other embodiments of the present invention, a computer-implemented method for virtual patching of security vulnerabilities in an industrial production environment includes a security operations center computer receiving an indication of security vulnerabilities exploitation methods applicable to industrial control systems and reproducing those security vulnerabilities exploitation methods using a simulated industrial environment. The security operations center computer generates a vulnerability exploitation detection signature corresponding to the security vulnerabilities exploitation methods and identifies users of industrial controllers to which the vulnerability exploitation detection signature is applicable. Then, for each identified user, the security operations center computer (i) generates a virtual patch operable to detect attempted execution of the security vulnerabilities exploitation and (ii) distributes the virtual patch to the identified user.

According to other embodiments of the present invention, a computer-implemented method for virtual patching of security vulnerabilities in an industrial production environment includes a security operations center computer receiving an indication of attack campaigns applicable to industrial control systems and generating an attack detection signature corresponding to the attack campaigns. The method further includes the security operations center computer identifying users of industrial controllers to which the attack detection signature is applicable. For each identified user, the security operations center computer generates a virtual patch operable to detect the attack detection signature and distributes the virtual patch to the identified user.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to improving the resiliency of control systems, with respect to cyberattacks, with virtual patching and automated distribution of security context information. The virtual patch described herein may be deployed as PLC kernel module application with in-depth low level access to the operating system and memory to detect and, if configured, intercept suspicious activities or configuration commands. Virtual patching for PLCs may be applied to greatly mitigate the problems associated with patching of live production systems, since it allows for the detection of vulnerability exploitation and, in some cases, attack prevention.

PCT Patent Application Serial No. PCT/US2016/28893 filed Apr. 22, 2016 and entitled "Improving Control System Resilience by Highly Coupling Security Functions with Control," which is incorporated herein by reference, describes a security anomaly detection app comprising an intrusion detection scheme based on the knowledge of the process variables (sensors and actuators). The disclosed architecture and application offered local protection for the PLC based on unsupervised machine learning. The systems and methods described herein complement and enhance that architecture and application by providing a mechanism to deploy low footprint attack signatures from a Security Operations Center (SOC) automatically as virtual patches.

Figure 1:
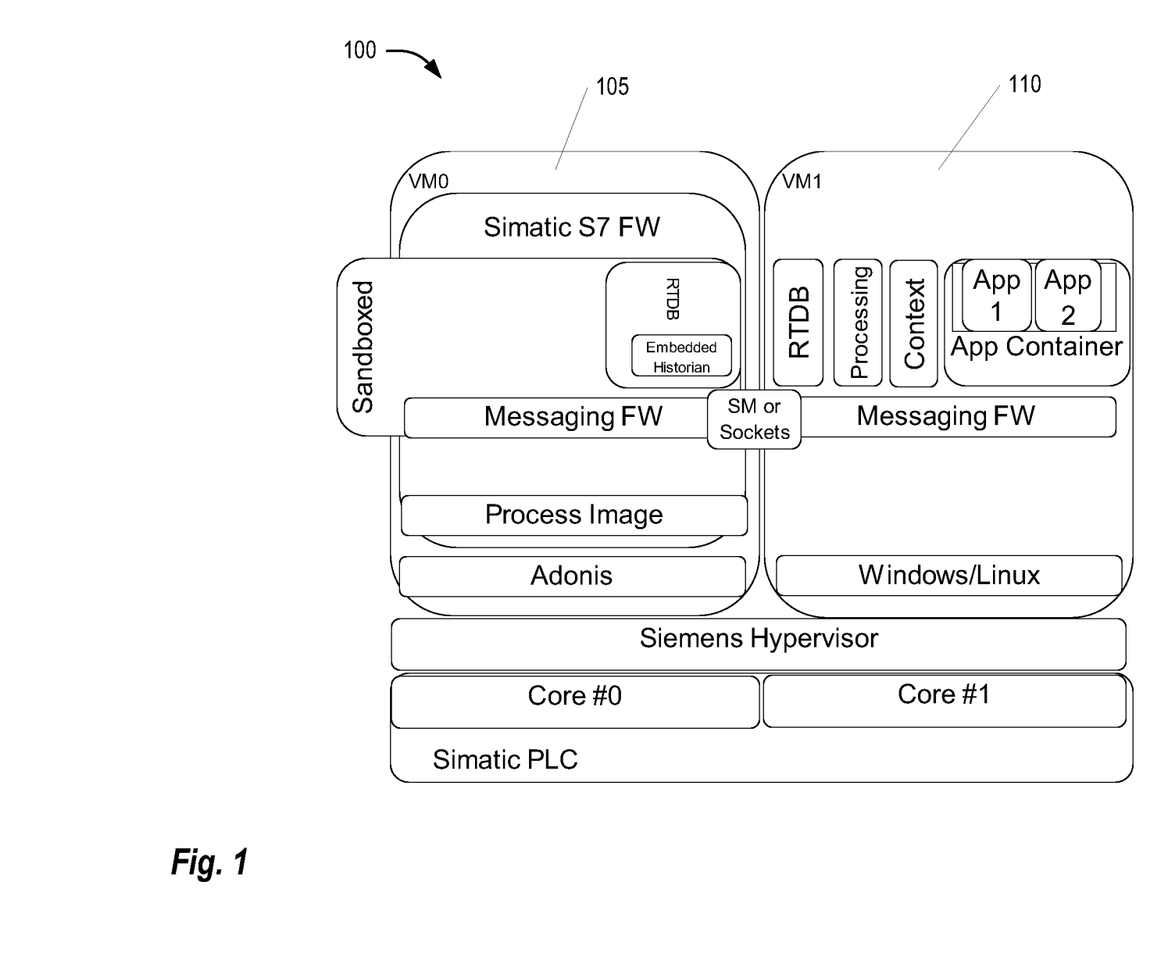
FIG. 1 demonstrates a highly-coupled control-security PLC with a cybersecurity application, according to some embodiments.

FIG. 1 demonstrates a highly-coupled control-security PLC 100 with cybersecurity application, according to some embodiments. This example shows an implementation within a Siemens software environment; however, it should be understood that the general concepts described in FIG. 1 may be extended to equivalent software in other environments as well. The PLC 100 has multiple processor cores which execute a plurality of virtual machines (VM). In some embodiments, each core may be dedicated to a distinct virtual machine. In the example of FIG. 1, one virtual machine 105 is configured to implement Simatic S7 Firmware (FW) and the other virtual machine is 110 configured to implement either Windows or Linux. The Simatic S7 PLC firmware executes one or more control programs for interfacing with field devices in the automation environment. Any application running on VM1 has no adverse impact on control applications running on VM0. Within virtual machine 105, there is a real-time database driven by an embedded historian. It collects all real-time process image data related to the one or more control programs as time series, such as inputs, outputs, memory variables, and commands from one or more human machine interface (HMI) and the manufacturing execution system (MES). PCT Patent Application Serial No. PCT/US2015/64863 filed Dec. 10, 2015 and entitled "Distributed Embedded Data and Knowledge Management System Integrated with PLC Historian," which is incorporated herein by reference, provides examples of techniques for implementing an historian that may be employed with the highly-coupled control-security PLC 100 described herein. In the Windows/Linux virtual machine 110, another real-time database exchanges data with the real-time database (RTDB) hosted in Simatic S7 firmware using an internal communication channel or shared memory (SM).

The "Processing" block in virtual machine 110 is a function block which performs primary data processing, reading/writing/filtering/smoothing primary data in the real-time database. The block of "Context" in virtual machine 110 works as a translator, which translates the meaning of all data into production knowledge, such as translating measurements into temperature (e.g., of a beer fermentation tank). There are multiple applications hosted by an App Container in the virtual machine 110, some of which can be directed at security functionality. For example, App1 could be used for a virtual patching app for cyberattack detection/prevention (as discussed in further detail below) and App2 could be a machine prognostic analysis application. They both need to work based on collected data in the real-time database. In this case, the virtual patching app can be easily added, removed and updated, just as a Windows or Linux application. Methods and systems for implementing apps within app containers in a PLC are described in further detail in U.S. patent application Ser. No. 15/040,565, filed Feb. 10, 2016 and entitled "Extending a Programmable Logic Controller with Apps," which is incorporated herein by reference.

The term virtual patch, as used herein, refers to an executable algorithm (signature) describing a distinct vulnerability or attack. The virtual patch is created based on one or more of (i) the analysis of the reproduced vulnerability/attack; (ii) the determination of the potential root cause of the PLC vulnerability/attack; (iii) the recorded attack vector that is associated with the root cause of the vulnerability; (iv) the required enabled PLC configuration that allows for the attack vector to operate (e.g., enabled vulnerable services), and (v) other contextual information such as the production process type, controlled variable, connected machinery, etc. Each virtual patch might contain details of the attack as defined by a standardized language such as the Cyber Observable eXpression (CybOX™) or a derived extended version of it that considers particularities of the control systems. These details may include, for example, file pattern, network packets/flow, user session identifier, system event log, etc. The virtual patch may be described through ontologies that could explain intrusion/cyber security attacks such as fake commands from HMI, tampered data blocks from IVIES and even denial-of-service (DoS) attacks. The ontology may also include other knowledge, such as adverse impacts lead by cyberattacks, (e.g., degraded performance in terms of production and quality, damage of machines). The intrusion and cybersecurity ontology, as well as additional production process knowledge, can connect causally between process image data (field data) and other forms of context knowledge in controllers, and enable reasoning about abnormal events.

The deployment of the virtual patching engine on each controller (described in further detail below) enables signature based security intrusion detection based on specific applicable attack scenarios for each case. In some embodiments, only a small subset of relevant signatures is loaded, based on the potential risks of exploitation of each available attack vector, which prevents unnecessary CPU utilization. Each virtual patch contains payloads and instructions that allow a detection engine on a control device (e.g., PLC) to verify continuously for a given combination of system discrete security events (e.g., a configuration change) and suspicious data flow (network or memory) to be inspected. The validation and verification of applicability of the virtual patch for a given PLC/scenario may be performed before its deployment.

Figure 2:
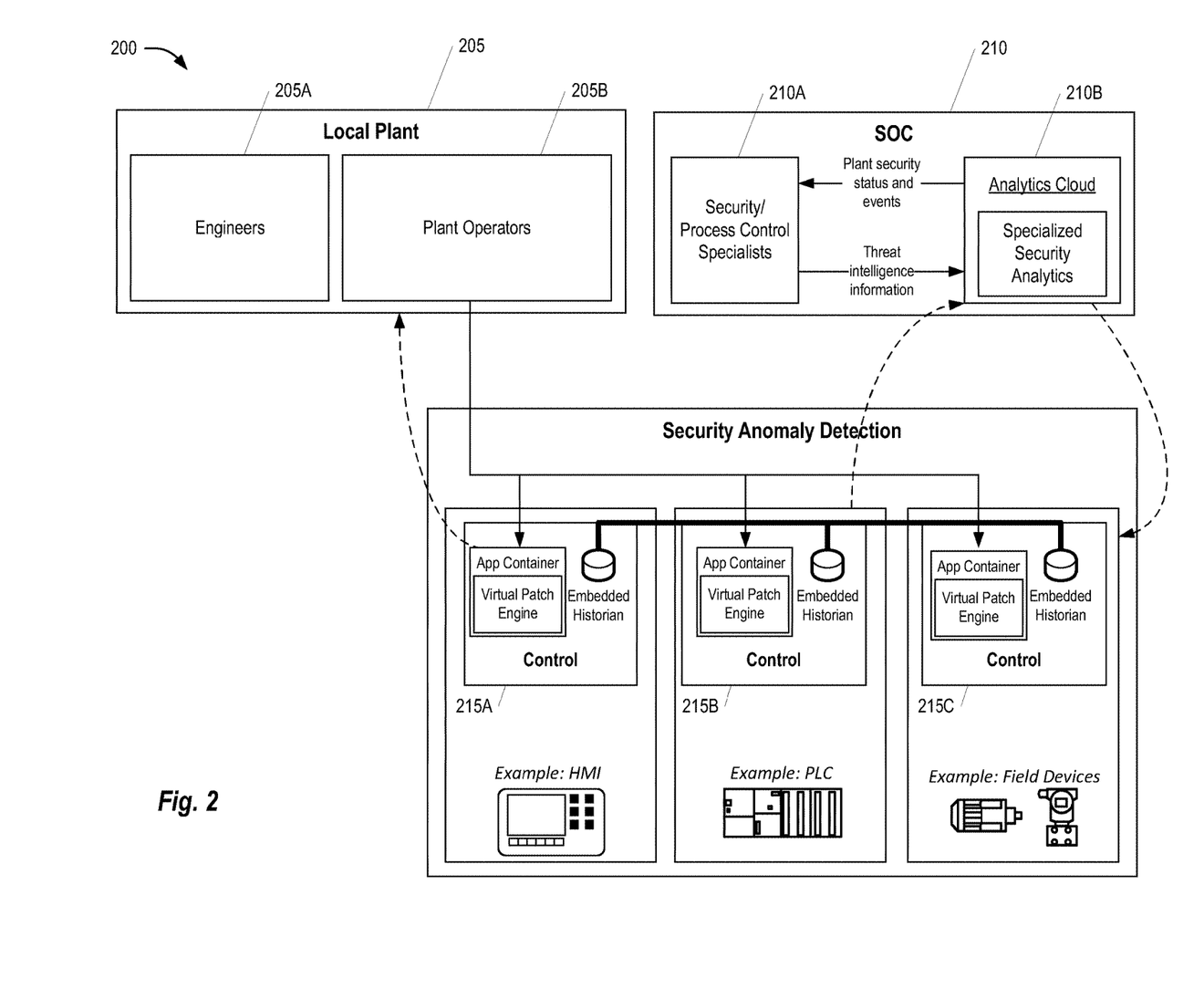
FIG. 2 illustrates an architecture of the security anomaly detection and virtual patching, according to some embodiments.

FIG. 2 illustrates an architecture 200 of the security anomaly detection and virtual patching, according to some embodiments. This example is conceptually divided by activity into three areas: a Local Plant 205 activity performed by engineers and plant operators, Security Anomaly Detection Functionality implemented on Controllers (or other enabled devices) 215A, 215B, and 215C, and threat management at a SOC 210. The arrows presented in FIG. 2 are presented for illustrative purposes to show some potential ways that information/data may be transferred between devices in the architecture 200; however, it should be understood that these arrows are merely examples of the various information/data transfers that may take place using the architecture 200 and transfers between different pairs of devices may be similarly implemented within the architecture 200.

The Local Plant 205 portion of the workflow comprises Engineers 205A and Plant Operators 205B. The Engineers 205A develop and deploy the anomaly detection apps, virtual patching apps, and other security apps to the Controllers 215A, 215B, and 215C. Additionally, the Engineers 205A may configure the Controllers 215A, 215B, and 215C (either via the deployed apps or through other system settings) to specify the level of information exchange between the Controllers 215A, 215B, and 215C and the SOC 210. Moreover, in some embodiments, the Engineers 205A may specify how the SOC 210 should react to the certain threat conditions.

The SOC 210 comprises Security/Process Control Specialists 210A and an Analytics Cloud 210B. Security/Process Control Specialists 210A provide threat intelligence information to the Analytics Cloud 210B. The Analytics Cloud 210B processes the threat intelligence information with specialized security analytics to identify new attack vectors which can be delivered to the Controllers 215A, 215B, and 215C (as described in further detail below). Additionally, the Analytics Cloud 210B may gather plant security status information (e.g., events, etc.) and share this information with the Security/Process Control Specialists 210A to further refine the threat intelligence information.

Once deployed to the Controllers 215A, 215B, and 215C, the anomaly detection app enables security behavior on each device (e.g., security event/log collection). Additionally, in some embodiments, the anomaly detection app gives situational awareness context to the Controller 215A, 215B, and 215C. Each Controller 215A, 215B, and 215C may also provide distributed monitoring enabled by app-to-app communication to increase resiliency. Any attempt to manipulate process control or process view may be detected both locally and via the peers using a distributed database management system (DDMS) spanning the embedded historian included in each Controller 215A, 215B, and 215C.

Additionally, this architecture 200 shown in FIG. 2 may be used for the provisioning of custom security signatures to be deployed as data points for the local database. For example, new (external) attack vectors, correlated with global intelligence, may be custom delivered based on context from the Analytics Cloud 210B included in the SOC 210. Similarly, security anomalies may be broadcasted by the Controller 215A, 215B, and 215C to the SOC 210. Custom signatures and virtual patches can be issued by the SOC 210 and delivered through its Analytics Cloud 210B (optionally, the customer might decide to have its own SOC). For example, in some embodiments, the Analytics Cloud 210B executes one or more applications which correlate external security information (e.g., threat intelligence), product information (e.g., PLC technical features), security vulnerability information and other context relevant information, such as, without limitation, production process data, process configuration, network topology and security configuration. Based on this information, the Analytics Cloud 210B identifies attack vectors applicable to the Controllers 215A, 215B, and 215C. Once these attack vectors have been identified, a virtual patch for detecting the attacks may be generated and deployed to the Controller 215A, 215B, and 215C, after the security professionals 201A validate and verify the cyberattack and the virtual patch. This infrastructure might also be used to prevent incidents that happened in the past (for which the attack signature or TTP—Tactics Techniques and Procedures is known) from happening in a similar infrastructure that has the same vulnerabilities.

Each Controller 215A, 215B, and 215C includes a local database of virtual patches within its respective embedded historian that runs as a DDMS. Each of these databases has a dataset referred to herein as a "virtual patch database." Using these databases, attack signatures or data from other connected control devices can be read to confirm that an attack is occurring. For example, by analyzing network connection events from Controllers 215A and 215B, Controller 215C may be able to confirm a given malicious pattern.

The virtual patch database may be divided in two main instances: real time and post-mortem. The real time instance is reduced in size (limited number of virtual patches can be installed) and allows for command interception. Optionally, the intercepted command execution could be confirmed by checking if a symbolic execution of the requested command, given the available input and memory status lead to an unsafe process status. The post mortem does not allow intercepting the control or configuration command, but permits the confirmation of the security compromise to be alerted and additional forensic data to be securely collected.

The App Container of each Controller 215A, 215B, and 215C includes a kernel module security application referred to herein as the "virtual patch engine" (as shown in FIG. 2). This virtual patch engine communicates with the SOC 210 to automatically receive virtual patches and threat intelligence as security feeds. The engine uses this information to execute a detection algorithm which continually scans the virtual patch database in order to identify a matching suspicious security behavior indicative of cyberattack execution. The virtual patch engine may additionally collect system relevant information such as running processes/threads, network connections, file creation/modification and PLC specific information such as read and written memory blocks, system configuration changes, alarm status change, the scan time, block execution time, etc. The collected information may then be analyzed by the virtual patch engine in order to identify matching ongoing attacks. In some embodiments, the embedded local historian of each Controller 215A, 215B, and 215C also allows for a historical analysis of the recent system changes within a limited time slot. Once an attack has been identified, it can be handled locally by the controller (e.g., blocking network traffic from a particular address). Alternatively (or additionally), a notification about the attack can be sent to the Plant Operator 205B for further escalation or management via security tools.

In some embodiments, the virtual patch engine uses symbolic execution of control code to determine the future consequence of running a given configuration in combination with a given control command/control logic and, if needed (e.g., if it brings the system to an unsafe state or violates safety constraints), blocks it. In some embodiments, the virtual patch engine intercepts all calls attempting to access the PLC application program, as well as I/O and other connected PLC interfaces. The virtual patch engine validates each call before allowing the call to proceed. The detection of the virtual patch engine can optionally be activated by a security anomaly detection app (discussed above) or during an applicable attack campaign.

Figure 3:
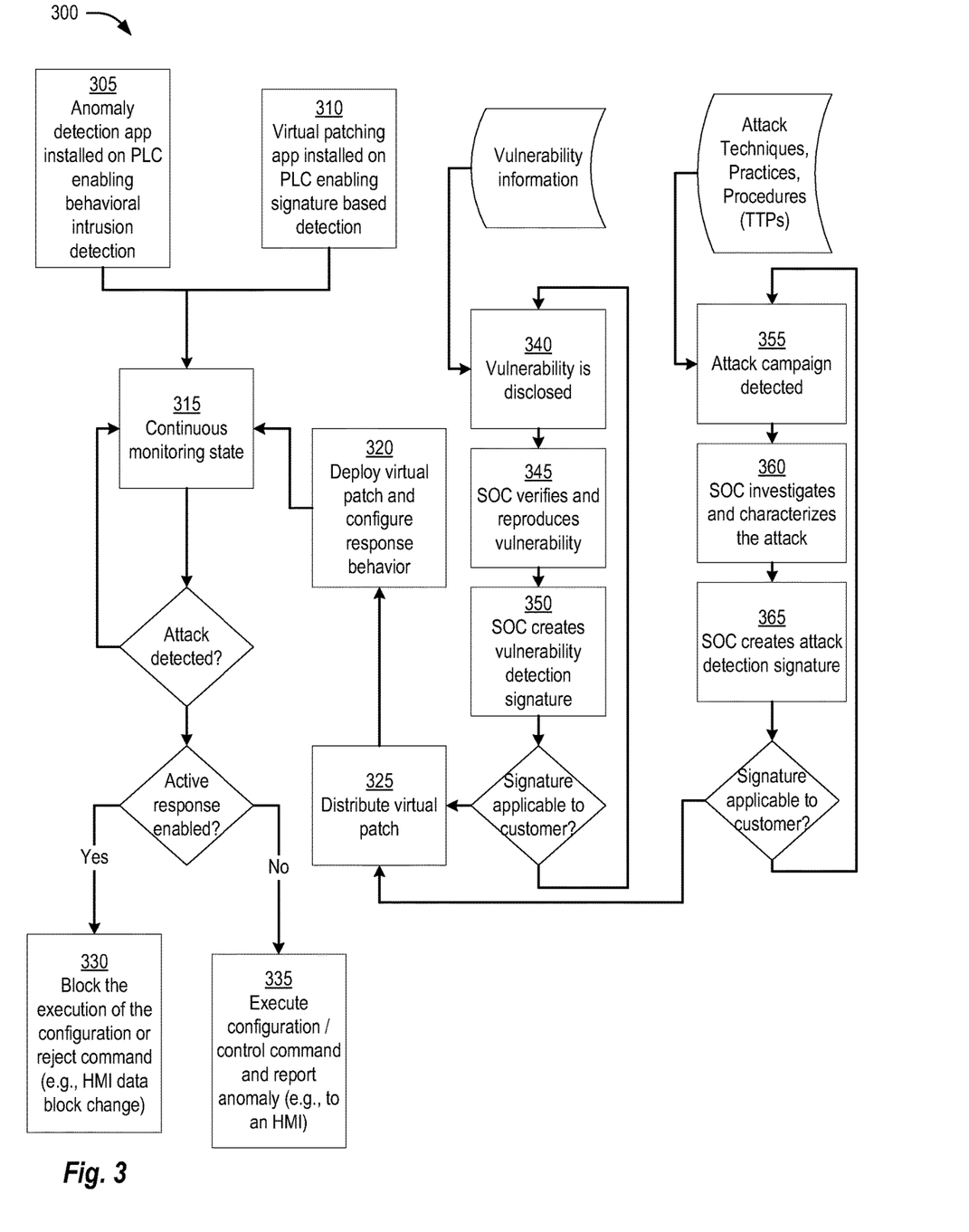
FIG. 3 illustrates a virtual patching process, according to some embodiments.

FIG. 3 illustrates a virtual patching process 300, according to some embodiments. The process 300 starts as two security-focused apps are installed on the PLC. More specifically, at step 305, an anomaly detection app installed on PLC which enables behavioral intrusion detection and, at step 310, a virtual patching app installed on the PLC which enables signature based detection. These apps may generally be installed in any order, although there may be dependencies between the apps in some embodiments that dictate installation order. Once installed, at step 315, the PLC enters into a continuous monitoring state.

Once an attack is detected, a response operation is performed by the controller. Different levels of response are possible based on a configuration on the device (e.g., specified within one or more of the apps by an engineer or operator). In the least intrusive response action, the security anomaly is only reported and logs are exported outside the controller. On the other extreme, configuration commands may be rejected and a safe shutdown action might be triggered. As an example, the availability of a running vulnerable HTTPS service enabled by a Heartbleed Shellshock vulnerable OpenSSL library could be disabled upon the detection of the injection of a network Heartbleed payload. Alternatively, the command could be accepted, but the response avoided. Between the two extremes other response forms may be employed.

In the example of FIG. 3, two possible responses are shown, selected based on whether "active response" is enabled on the controller. The term "active response" refers to a controller setting indicating whether execution should be blocked or not. This setting may be provided, for example, by an engineer or operator of the controller. If active response is enabled, at step 330, execution is blocked or one or more commands may be rejected. Alternatively, if active response is not enabled, at step 335 the configuration/control command is executed and the anomaly is reported (e.g., via the HMI or directly to the plant operator).

Continuing with reference to FIG. 3, at step 340 a new vulnerability is disclosed, either by a device within the automation environment or by an external source. At step 345, the SOC verifies and reproduces the vulnerability. Next, at step 350, the SOC creates a new vulnerability exploitation detection signature which will enable a particular device to identify the vulnerability and attempts to exploit it. Then, at step 325, a virtual patch is created and distributed to each customer that the signature is applicable to (based e.g., on matching firmware version, hardware, and other parameters). At the customer's site, the virtual patch is deployed at step 320 by the automation system. Engineers or operators might decide to use a software interface to approve the patch but, generally, the automation system will deploy the patch automatically once it is selected/confirmed. Once deployed, the engineers or operators may modify the system configuration based on the patch. For example, for a particular vulnerability, the engineer or operator may configure the controller to shut down, either gracefully or immediately upon detection of the relevant vulnerability exploitation signature. It should be noted that steps 320 and 325 can be combined in scenarios where the SOC is tightly integrated with the automation environment or the plant operators/engineers have delegated some responsibilities to the SOC. Thus, the SOC (or some other intermediary group or service) can distribute the virtual patch to the control device(s) directly and configure the corresponding response behavior (e.g., based on preferences provided by the plant's engineers or operators). It should be noted that this mechanism might be used to detect attack methods that do not necessarily depend on the existence of vulnerabilities. For example, these signatures could be used to detect "brute force" type of attacks or "resource exhaustion." Moreover, in addition to applying payload detection algorithms for disclosed vulnerabilities, attack campaigns could also be detected through the distribution of virtual patches.

In some embodiments, the virtual patch is enabled by the computation of a Boolean algebra for which a true result denotes the positive characterization of the attack (similarly to Security Information and Event Management correlation rules). The following example illustrates this case:

$$\text{True attack} = x \wedge (y \vee (z \wedge \neg (a=1.6))),$$

where x is the matching authentication event, y is the inbound memory block change request, z is the matching outbound command value, and a is the CPU firmware version.

FIG. 3 shows how the system can react to new attack techniques, practices, and procedures as they emerge. At step 355 an attack campaign is detected, for example, by the automation devices, by the plant engineers or operators, or by the SOC itself. Next, at step 360, the SOC investigates accordingly and characterizes the attack. Based on this characterization, the SOC creates an attack detection signature at step 365. Then, the signature is distributed and deployed to each customer to whom it applies in the form of a virtual patch at steps 320 and 325. The manner of distribution and deployment may be implemented in a manner similar to that discussed above with respect to vulnerability detection signatures.

The methods, systems, and apparatuses described herein provide several advantages compared to conventional systems. For example, the virtual patch described herein allows for automated distribution of PLC specific security signatures and offers the potential for protection for the time period between the vulnerability/patch release and the patch installation. Additionally, the techniques described herein may be applied with minimal impact to the PLC hardware, especially in distributed computing environments. For example, distributed idle CPU/memory resources may be employed for distributed anomaly detection and the distributed available storage space can be used for distributed anomaly detection. The use of distributed computing also allows decentralized attack detection, which avoids the single point of failure often present in conventional systems. The generated detection signatures/virtual patches also allow detection based on input data from multiple dimensions (e.g., network behavior, system behavior, production process behavior), rather than just pure network related data and events. Also, signatures might be created to protect adjacent devices. This approach offers an implementation path for protecting legacy devices.

The processors described herein as used by control devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A system for virtual patching of security vulnerabilities in an industrial production environment, the system comprising:
   a first virtual machine executing one or more control programs;
   a second virtual machine executing a virtual patching engine security application configured to collect system information related to the one or more control programs, and apply one or more virtual patches to the system information to identify one or more security attacks;
   an internal communication channel configured to facilitate transfer of the system information between the first virtual machine and the second virtual machine; and
   a hypervisor executing the first virtual machine and the second virtual machine,
   wherein the virtual patching engine security application performs symbolic execution of control code executed by the industrial automation device to determine an indicator of future consequences of running one or more configurations of the industrial automation device in combination with one or more control commands.

2. The system of claim 1, wherein the virtual patching engine security application blocks future execution of the one or more control commands if the indicator of future consequences corresponds to (i) an unsafe system state or (ii) a violation of one or more predetermined safety constraints associated with the industrial production environment.

3. The system of claim 1, wherein the second virtual machine executes:
   a process image updated according to a scan cycle with automation system production data associated with one or more field devices;
   a networking component configured to send and receive automation system network data on a plant floor network.

4. The system of claim 3, wherein the second virtual machine additionally executes a real-time database comprising an embedded historian configured to store the automation system production data collected via the process image and the automation system network data collected via the networking component.

5. The system of claim 4, wherein the system information generated by the industrial automation device during operation is retrieved by the virtual patching engine security application from the embedded historian.

6. The system of claim 1, wherein the virtual patching engine security application is further configured to (i) receive one or more new virtual patches generated by a security operations center and (ii) store the one or more new virtual patches in the distributed database.

7. The system of claim 6, wherein the virtual patching engine security application is further configured to transmit an indication of the one or more security attacks to the security operations center.

8. A system for virtual patching of security vulnerabilities in an industrial production environment, the system comprising:
   a first virtual machine executing one or more control programs;
   a second virtual machine executing a virtual patching engine security application configured to collect system information related to the one or more control programs, and apply one or more virtual patches to the system information to identify one or more security attacks;
   an internal communication channel configured to facilitate transfer of the system information between the first virtual machine and the second virtual machine; and
   a hypervisor executing the first virtual machine and the second virtual machine,
   wherein the virtual patching engine security application is further configured to:
   identify one or more control commands associated with the one or more security attacks;
   in response to identifying one or more security attacks, determine whether an active response setting is enabled;
   if the active response setting is not enabled, execute the one or more control commands and report an anomaly to an operator associated with the industrial automation device; and
   if the active response setting is enabled, blocking execution of the one or more control commands.

9. The system of claim 8, wherein the second virtual machine further comprises:
   an instance of a distributed database spanning a plurality of industrial controllers and storing the one or more virtual patches.

10. The system of claim 8, wherein the system information generated by the one or more control programs during operation is retrieved by the virtual patching engine security application from an embedded historian in the first virtual machine.

11. The system of claim 10, wherein the second virtual machine comprises an app container configured to execute a plurality of apps and the virtual patching engine security application is executed in the app container.

12. The system of claim 8, wherein the system information comprises one or more of memory blocks where at least one of a read or write operation has been performed; system configuration changes; alarm status changes, processes executing on the first virtual machine; threads executing the first virtual machine; networking connections utilized by the first virtual machine; file creation information; and file modification information.

* * * * *